June 11, 1957     J. M. MORRIS     2,795,318
METHOD OF AND APPARATUS FOR CONVEYING PULVERULENT MATERIAL
Filed Nov. 16, 1955     2 Sheets-Sheet 2

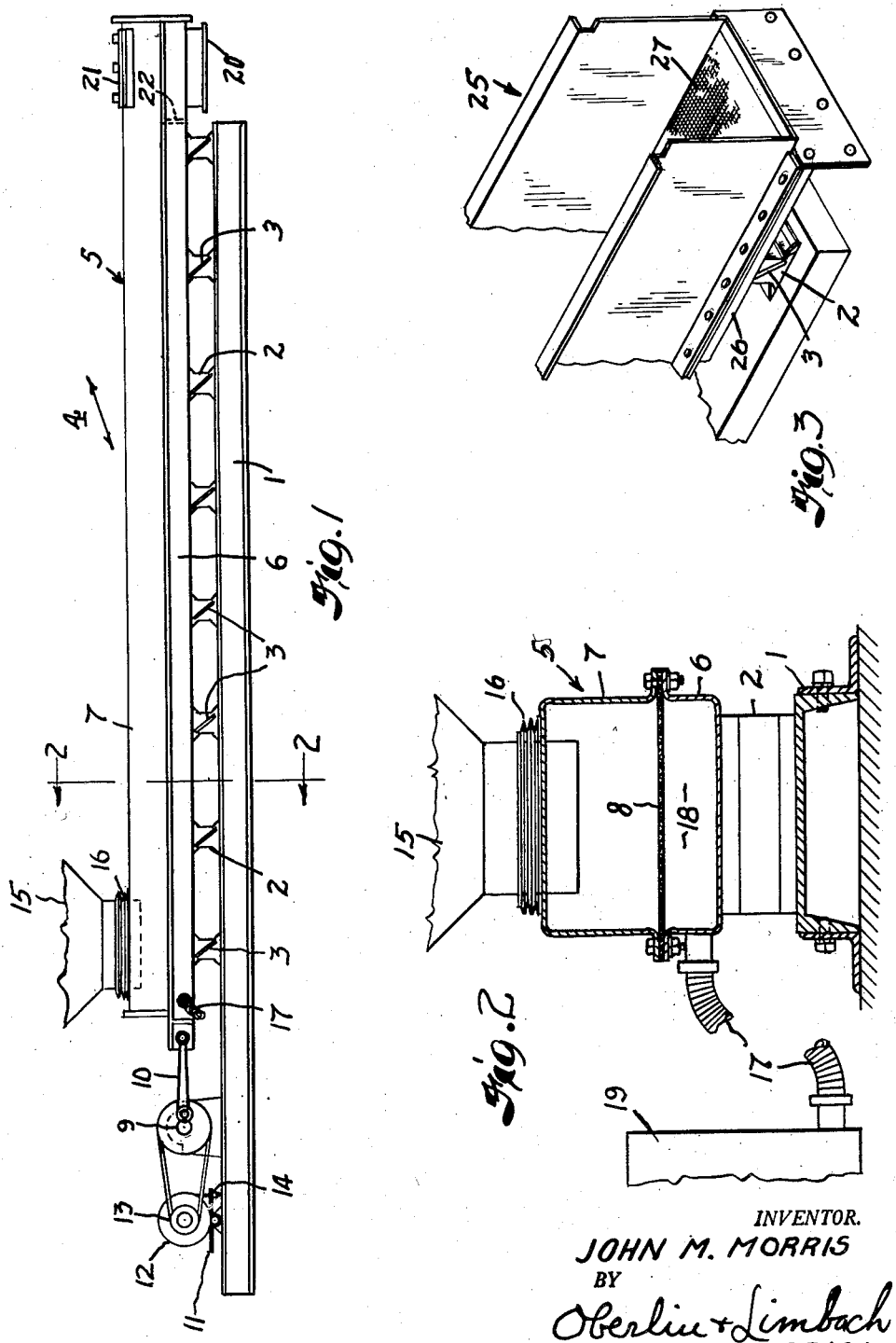

INVENTOR.
JOHN M. MORRIS
BY
Oberlin & Limbach
ATTORNEYS.

United States Patent Office 2,795,318
Patented June 11, 1957

2,795,318

METHOD OF AND APPARATUS FOR CONVEYING PULVERULENT MATERIAL

John M. Morris, Louisville, Ky., assignor to Carrier Conveyor Corporation, Louisville, Ky., a corporation of Kentucky Application November 16, 1955, Serial No. 547,073

10 Claims. (Cl. 198—220)

This invention relates, as indicated, to a method and apparatus for the movement of a pulverulent material from one point to another. In moving materials of this type, the method and equipment used will generally depend on the elevation of the starting point with respect to the destination of the material. When the destination is very considerably lower than the starting point so that the angle of declination of the line along which the material moves is substantially greater than the angle of repose of the material, then the movement of the material can be accomplished by simple chute apparatus.

Conversely, when the destination is substantially higher than the starting point so that the angle of elevation along which the material must move is considerable, then bucket conveyors or air streams within which the material is entrained must be utilized. The present invention is concerned with the movement of material along lines which lie between these extremes.

When the material to be moved is extremely fine such as wheat flour, Portland cement, and the like, its movement downhill is many times accelerated or made possible at all by the use of a fluidizing conveyor in which the material supporting surface is gas permeable and then by causing a gas to flow upwardly through the material to aerate the same so that it is "fluidized." Its fluidized angle of repose may be so reduced that the material may be moved along lines having a declination of as low as about 10°. When the angle of declination becomes much less than this mount, while the material may move to a slight extent, its motion is many times too slow to be commercially feasible, unless additional influence is brought to bear on the material as occurs when the conveyor, acting as a feeder, has the work material deposited thereon under a head such as is provided at the outlet of a bin.

When the line along which the material is to be moved has an angle of elevation which is above the angle of declination just referred to, then fluidizing the material has either substantially no effect, or actually causes the same to flow backward toward the starting point under the influence of gravity.

While vibratory conveyors which usually depend on a throwing action are quite successful in moving materials of substantial particle size upwardly along an angle of inclination which may be substantial, depending upon the nature of the material, such conveyors have never been used successfully for conveying either horizontally or upwardly or along angles of slight declination, materials which have those characteristics which render them capable of being fluidized.

It is a principal object of this invention to provide a method and apparatus whereby fluidizable pulverulent materials, or materials which contain a substantial proportion of particles which, if separated and segregated, could be fluidized, can be moved economically and rapidly along lines heretofore possible only with much more expensive equipment.

It is a further object of this invention to provide an improved method and apparatus wherein the functional characteristics of the aerated or fluidized type of conveyor and the vibratory type of conveyor, which depends upon the throwing action, are combined to achieve a result heretofore never possible and thus more than the cumulative effect of the two.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevation view of one form of the present invention;

Fig. 2 is a transverse cross-section view on somewhat enlarged scale, such view having been taken substantially along the line 2—2, Fig. 1;

Fig. 3 is a fragmentary perspective view of a modified form of the present invention;

Figure 4:
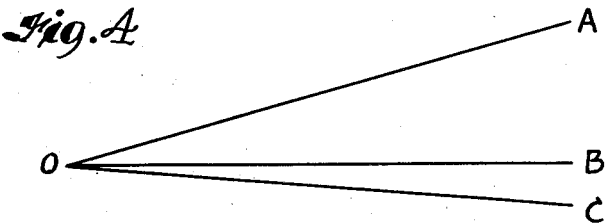
Fig. 4 is a diagram showing the range of angles with respect to the horizontal within which the conveying deck of the apparatus of this invention may be arranged in carrying out the present invention.

Referring now more particularly to the drawing, and first to Figs. 1 and 2 thereof, the conveyor comprises a base 1 to which transverse, resilient supporting and guiding members 2 are secured in longitudinally spaced-apart relation, said members preferably, but not necessarily, comprising rubber or rubber-like blocks having obliquely disposed guiding struts in the form of metal plates or rods 3 molded therein so as to directionally control the relative movement between the trough 5 and base 1 in the inclined path of vibration 4. The conveyor trough assembly 5 is supported on and connected to the top of said series of resilient members 2.

As above mentioned, said resilient members 2 as herein shown are to be regarded merely as illustrative, and obviously numerous other forms thereof that are disclosed in the patent to Robert M. Carrier, Jr., Patent No. 2,706,112, granted April 12, 1955, may be substituted. Moreover, in some instances, satisfactory results have been obtained with other known forms of resilient mounts such as coil springs or leaf springs extending obliquely between the base 1 and trough assembly 5 as is disclosed in the Carrier et al. Patents 2,630,210 and 2,630,211, granted on March 3, 1953.

The trough assembly 5 as shown in Fig. 1 is in a horizontal position, but, as hereinafter explained, said trough assembly may be inclined upwardly or downwardly, if desired, within a certain range for maximum efficiency. Said trough assembly 5 may be a helix as disclosed in Carrier Re. 22,904.

The trough assembly 5 above referred to comprises mating, opposed channel-shaped parts 6 and 7 which are bolted or otherwise secured together to clamp a porous or semi-permeable member 8 therebetween. The characteristics of the materials from which the member or deck may be formed will be treated in a later section of this description.

If desired (or necessary), struts may be secured at longitudinally spaced intervals transversely across the upper edges of the lower trough-shaped part 6 to rigidify the member 8 and also to assist in the supporting of the load of the conveyed material thereon.

Any suitable means may be employed for imparting to the conveyor assembly a vibration along the desired path 4, and, by way of example, the vibrating means is shown as comprising an electric motor-driven eccentric shaft 9 having a rod 10 pivotally connected to the throw of said eccentric and to the end of the conveyor assembly 5.

Should it be desired to vary the frequency of vibration, mount 11 of the electric drive motor 12 may be pivotally mounted on the base 1 and the drive pulley 13 on said motor may be of the variable speed type wherein the flanges are spring-loaded so that, as the distance between the motor shaft and the eccentric shaft 9 is increased or decreased, the diameter of the belt as it passes over the pulley 13 decreases or increases to thus vary the speed of shaft 9. The motor mount 11 may be moved and held in desired adjusted position as by means of a screw 14 which is threaded into base 1 and bears against the motor mount 11.

Obviously, equivalent drive means such as electromagnetic vibrators, revolving eccentric weights, or the like, may be substituted as is well known in the art. Whatever drive means is used, however, it is essential that the direction and extent of movement of an incremental area on the surface of the deck 8 be controlled to lie within limits hereinafter more particularly specified.

Adjacent one end of the conveyor and thereabove is a feed hopper 15 for introducing conveyable material onto one end of the deck 8 for conveying toward the other end. A flexible sock 16 may be connected between the cover part 7 of the conveyor assembly 5 and the feed hopper 15 so that the former may vibrate independently of the latter.

Connected adjacent the feed hopper end of the assembly 5 is a flexible hose 17 which leads into the air chamber 18 or duct formed by the lower part 6 and the semi-permeable membrane 8, said flexible hose 17 communicating at its other end with an air pressure supply unit 19 which may be self-contained with a blower, drive motor, air cleaner, and relief valve (not shown) therein. The air supply should be such that its volume, velocity, and pressure may be controlled at will.

It is to be understood that, although the fluid which is herein employed will most often be air, the air may be in heated condition to effect, in addition to the fluidizing of the bed of material, a heating or drying action thereon.

Other gases may be employed, heated or not, as required, to effect desired treatment or chemical action of the material which is loaded onto the conveyor so that such treatment will progress efficiently as the material is conveyed from one end toward the other of the conveyor. Similarly, the fluid may be a cooling fluid to extract heat from heated material loaded onto the conveyor.

In the form of the invention illustrated in Figs. 1 and 2, the end of the conveyor opposite the hopper 15 is provided with a downwardly extending discharge port 20, and, in order to assist in cleaning out, a removable door 21 is provided at the top of part 7. The semi-permeable or porous membrane 8 will, of course, end just ahead of port 20 and a transverse partition 22 is provided to close this end of the duct 18 so that all of the fluid introduced thereinto must pass through the porous material-supporting deck 8.

In Fig. 3, there is shown a modification of the invention with the cover of the conveyor trough assembly 25 removed. In this construction, the conveyed material is discharged from the end of the conveyor rather than from a bottom discharge port as is shown in Fig. 1. As before, air under pressure will be supplied into duct 26 for passing upwardly through the porous deck 27. The conveyor assembly is resiliently supported on blocks 2 of rubber with direction-imparting struts 3 molded therein.

As previously indicated, the above-described apparatus is but one specific embodiment of the apparatus of this invention which may be used in carrying out the methods of this invention.

Figure 7:
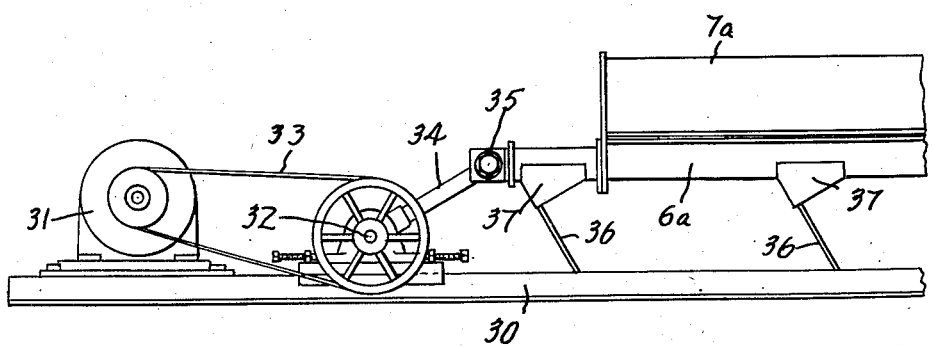
Fig. 7 is a fragmentary side elevation of an alternative form of construction embodying the present invention.

In the embodiment of the invention illustrated in Fig. 7, the parts 6a and 7a correspond to the parts 6 and 7 respectively as shown in Figs. 1 and 2. In the Fig. 7 form of the invention, there is provided a longitudinally extending base 30 adjacent one end of which is mounted an electric drive motor 31 which drives the eccentric shaft 32 as by means of the belt 33 which is trained over pulleys on the motor drive shaft and on the eccentric shaft.

The pitman arm 34 is connected at one end to the throw of the eccentric shaft 32 and is connected at the other end through a resilient bushing 35 to the end of the conveyor assembly 6a—7a, said assembly being mounted for directionally controlled vibration through the obliquely disposed leaf or plate springs 36 which have their lower ends fastened to the base 30 and their upper ends fastened to brackets 37. By reason of the oblique disposition of said springs 36, the conveyor assembly 6a—7a is constrained to vibrate along a path which has the desired angle of attack with respect to the material supporting deck 8 which is clamped between the parts 6a and 7a.

A full discussion of the nature of the vibratory motion will be found in the ensuing description under the heading "(5) The nature of the vibratory motion."

Apparatuses of the character shown in Fig. 7 are generally designed for vibration at a frequency corresponding to the natural frequency of the spring mountings 36, and in order to maintain a substantially constant amplitude of vibration under different conditions of load on the conveyor assembly 6a—7a, the resilient bushing 35, which is preferably preloaded, allows settling of the conveyor assembly under varied loads without upsetting the natural frequency-substantially constant amplitude vibration.

Broadly stated, this invention comprises apparatus for conveying pulverulent material in a path at an angle to the horizontal between about $-5°$ and about $+15°$ comprising an elongated gas-pervious deck having a permeability such that there will be substantially no sifting therethrough of the finer particles of the material to be conveyed while providing for the passage therethrough of a substantially uniform blanket of aeriform fluid, means for causing the flow upwardly through said deck of aeriform fluid at a rate not substantially in excess of that required to fluidize the bed of material to be conveyed, and means for vibrating said deck with a motion such that the work surface of said deck has an angle of attack of between about $+10°$ and about $+45°$ with respect to the plane of the deck.

From the foregoing, it will be noted that there are certain critical factors necessary to be observed in the construction and operation of the apparatus of this invention. They are:

(1) The nature of the material to be conveyed,
(2) The nature of the permeable deck of the conveyor,
(3) The angle of the direction of movement of the material,
(4) The degree of aeration of the material, and
(5) The nature of the vibratory motion of the conveyor deck.

Before treating separately these several factors which must be observed in carrying out this invention, it will be helpful to make a few general observations with respect to the fluidization of solid materials.

Whereas it is well known that a single spherical object such as a ping pong ball may be supported in space on a rising stream of air delivered from a nozzle, it is also well known that a mass of spherical particles may be similarly maintained in suspension and, when thus maintained, the mass has the appearance of a boiling liquid. Basically, of course, the air or aeriform fluid used to maintain the spherical particles, whether singly or in multiple, in suspension must have a minimum velocity which is calculated from the following formula:

$$V = \sqrt{\frac{8rDg}{3d}}$$

where $V$=velocity of the aeriform fluid in centimeters per second,
$r$=average radius of solid particles fluidized, in centimeters,
$D$=density of the solid comprising the particles,
$d$=density of the aeriform fluid, and
$g$=the acceleration due to gravity, in C. G. S. units.

In most conveyors where simple aeration is relied upon to effect movement or to accelerate the movement of material which may be fluidized, an air velocity determined roughly by the foregoing formula is utilized. Such formula, however, may not be adhered to strictly, because there are very few materials which consist entirely of spheres. Ordinarily, when the particles are of irregular shape, a fluid flow in excess of that which would be determined by the formula must be used.

The amount of fluid required to establish fluidization, when not augmented by mechanical means or otherwise, will be in excess of that which is required to maintain the bed in a fluidized condition after such condition has once been established. Throughout the following description and in the appended claims where reference is made to maintaining the work material in a fluidized condition, the value intended is that which would be necessary to maintain the bed in a fluidized condition once such condition has been established.

There are many materials whose bulk density is such that they cannot be successfully fluidized. A typical example of such a material would be a washed gravel made up of smooth substantially spherical particles of extremely high unit density. When an attempt is made to fluidize such materials, the amount of air required is such that the material is ordinarily bodily entrained and carried along with the air stream instead of reaching the intermediate condition of fluidization.

Thus, when the term "fluidized mass" is used in this description and in the claims, it is intended to refer to a mass in which the aeriform fluid passes upwardly therethrough at such a rate that the particles of the solids of the mass assume limited motion without being entrained in the fluid; the fluid passing continuously upwardly through the mass of solids. This clearly distinguishes over conditions wherein the mass particles have a velocity which approaches that of the air stream and thus may become entrained in such stream.

With the foregoing basic considerations, it now becomes appropriate to take up for detailed consideration those critical factors which must be observed in the construction and operation of the apparatus of this invention.

(1) The nature of the material to be conveyed

It is necessary only that the material to be conveyed contain a substantial portion of particles which, when segregated and arranged in a bed as, for example, 4" thick, may be fluidized by aeration from beneath. Thus the material may consist entirely of such particles or it may contain only a substantial portion of such particles.

When an admixture of fluidizable material and heavier and larger particles, which by themselves may not be fluidized, is subjected to the action of a vibratory conveyor, the tendency is for the material to stratify with the finer particles in the lower layer adjacent the conveyor deck; and to the extent that such stratification occurs, it interferes with the efficient operation of the vibratory conveyor.

When the deck of the vibratory conveyor is made permeable and a uniform blanket of air caused to flow upwardly therethrough, then the order of stratification is reversed, depending upon the nature and quantity of the fine material and the degree of aeration. Any substantial amount of aeration, however, will thus reverse the stratification so as to carry the fine material to the upper portion of the layer so that the larger non-fluidizable heavier particles are in contact with the permeable deck of the vibratory conveyor, and they are moved along by an action which is apparently similar to that when such heavier non-fluidizable material is by itself conveyed on a vibratory conveyor having an impermeable deck.

When the material to be conveyed consists almost entirely of particles which may be fluidized, the use of a vibratory conveyor with a permeable deck whereby the material thereon may be aerated, makes possible the conveyance of such material along certain lines not possible by use of either a vibratory conveyor by itself or a conveyor which relies entirely on aeration. The directions along which the combined conveyor is effective when neither pure form may be used alone will be treated at a later point in this description.

(2) The nature of the permeable deck of the conveyor

The primary requisite of the permeable deck is that it be capable of transmitting upwardly therethrough a substantially uniform blanket of air and relatively low volumes per unit area without permitting the sifting downwardly through the deck of any substantial portion of the fines of the material. Stated in another way, the deck must not permit the sifting therethrough of any substantial portion of the work but must be capable of transmitting a uniform blanket of air which, in effect, breaks the adhesion between the body of material to be conveyed and the upper surface of the deck.

In the art of conveying solely by aeration, permeability is ordinarily defined in terms of a numerical factor which is the number of cubic feet of air per minute per square foot of exposed deck area which will be transmitted by the deck under a pressure equivalent to 2" of water. Conveyors which operate solely on the aeration principle utilize a deck having a permeability of from about 0 to 10.

Another manner in which permeability may be expressed is substantially the same as that given above but utilizing a higher reference pressure, i. e. the number of cubic feet of air per square foot of active deck surface which will be transmitted per minute under a pressure equivalent to 4" of water.

A preferred way of defining the permeability of the decks useful in the present invention is that they shall provide an air flow as a substantially uniform blanket of from .5 to 10 cubic feet per minute per square foot of exposed deck area at a pressure equivalent to 4" of water.

The deck may be made of a wide variety of materials. Closely woven fabrics such as those used in conveyors relying entirely on aeration may be employed satisfactorily, provided that they have the desired permeability and are able to withstand the temperature of the material being conveyed. When higher temperatures are encountered, inorganic materials are, of course, preferred for use. Thus, the deck may be formed of porous stone slabs or metal plates or screens having a mesh or opening size and description such as to provide a permeability factor within the ranges given above.

The maintenance of a uniform blanket of air cannot be stressed too greatly. When a foraminous plate or screen is used, the individual openings must be sufficiently small so that there will be no local areas of intense velocity which would cause a geysering of the material on the deck. This is one of the factors which requires that the deck be capable of passing a uniform blanket of the aerating fluid.

When reference is made to the maintenance of a uniform blanket of aerating fluid, by this is meant the maintenance of that condition in any local area all over the deck, although it should be noted that the volume and velocity of the blanket may be different in different local areas such as in different longitudinal or transverse areas on the deck.

(3) *The angle of the direction of movement of the material*

The present invention is concerned only with arrangements wherein the conveying deck occupies an annular relation with respect to the horizontal which is between an angle of elevation of about 15° and an angle of declination of 5°. This is illustrated in Fig. 4.

In Fig. 4, the line BO represents the horizontal. The line AO represents a line which has an angle of elevation of 15°, and the line CO represents an angle of declination of 5°. This invention is concerned only with the arrangement of the conveying deck within the angle AOC, and when the material progresses from left to right as viewed in Fig. 4.

(4) *The degree of aeration of the material*

As a general proposition, when carrying out this invention the material will be aerated to a lesser degree than in those cases wherein aeration alone is relied upon to effect conveying. In general, the degree of aeration should be at least sufficient to break the adhesion between the conveyable material and the permeable deck.

In Carrier Patent No. Re. 22,904, there is a detailed description of the mode of operation of a vibratory conveyor which depends upon a throwing action imparted to the material for the purpose of moving it progressively along the conveyor pan. As stated in that patent, conveyors of this type rely upon an incremental area on the surface of the conveyor pan achieving during each cycle of operation a vertical acceleration greater than the acceleration due to gravity.

In that portion of each cycle of movement during which a particle of material is in contact with the conveyor pan surface, the latter will impart to such material particle substantially the same acceleration as that to which the pan is subjected. Then, when the direction of movement of the conveyor pan is reversed at the upper end of each stroke, the conveyed material leaves the pan and is tossed forwardly, the pan receding at an acceleration greater than the acceleration due to gravity so that the material thus projected falls onto the pan after a sufficient interval of time, during which the pan has not only moved downwardly, but has also in effect moved backwardly.

For the purpose of determining the minimum amount of air which should be caused to flow through the permeable deck of the conveyor for most efficient operation in accordance with the present invention, it may be assumed that the bed of material is substantially solid and, on that assumption, the quantity of air caused to flow through the permeable deck should be such that there is always a positive pressure of air between the deck surface and the bottom of the bed during the time when the bed and deck separate in the manner described above; otherwise the formation of a partial vacuum or negative pressure void between the bed and deck interferes with such "directional throw" conveying action. The blanket of air thus at least equalizes the pressures above and beneath the bed of material so that the latter will be progressively tossed upwardly and forwardly along the deck. The actual value of such quantity of air depends to a certain extent on the relationship between relative velocities of the deck and bed, these being a function of the relationship between the maximum acceleration achieved by the deck and the acceleration due to gravity and also the bulk density of the material.

The maximum degree of aeration which will generally achieve best results will similarly vary with the nature of the material to be conveyed, but as a general proposition, best results will usually be secured if the degree of aeration is not substantially in excess of one-half that (expressed in terms of cubic feet of air per minute per square foot of surface area) necessary for fluidization of the material to be conveyed. This requirement must be met especially when the angle of elevation of the deck is such that the fluidized material would flow in a direction opposite to that desired.

When a mixture of material is conveyed which contains a substantial proportion on the order of up to 80% of material which is not fluidizable, the degree of aeration may be increased to the point where it is equal to the volume of air which would be required to fluidize that portion of the mass which is fluidizable if it were segregated and separately aerated. The practical upper maximum for any material is, of course, that degree of fluidization at which some of the finer particles begin to become entrained in the air stream.

(5) *The nature of the vibratory motion*

In the following description of this factor, it will be explained in terms of the path of movement of an incremental area on the active surface of the conveyor deck. The path of movement of such incremental deck area may be along a straight line or along a closed orbit. Whichever form of path is utilized, it should have a substantial vertical component and a substantial horizontal component.

Figure 5:
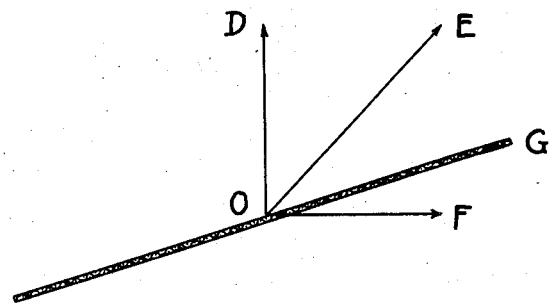
Fig. 5 is a diagram showing the angle of attack of the deck on the conveyed material when the deck is arranged at an angle of elevation of 15°.
Figure 6:
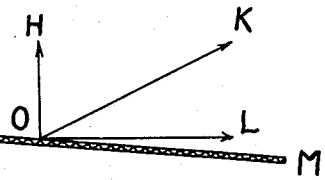
Fig. 6 is a similar diagram showing the angle of attack of the deck on the conveyed material when the deck is arranged at a declination of 5°.

In Fig. 5 there is illustrated the condition wherein the deck is arranged at an angle of elevation of 15° corresponding to the line AO in Fig. 4. The path of movement has a vertical component of DO and a horizontal component of FO, the resultant of which is EO. In Fig. 6 the deck is arranged at an angle of declination of 5° to correspond with the line OC of Fig. 4. The path of movement in Fig. 6 has a vertical component of OH, a horizontal component of OL, and a resultant of OK.

It is an important factor of this invention that the angle of attack of the conveying deck on the work represented by the angle EOG in Fig. 5 and the angle KOM in Fig. 6 be at least about 10°. The practical upper limit of the angle of attack is about 45°; the preferred angle of attack is about 30°.

The frequency and amplitude of the vibrations may be varied over rather wide limits provided, however, the relation of the frequency to the amplitude of the stroke is such that said incremental area on the active surface of the deck has a vertical acceleration which is at least equal to and preferably greater than the acceleration due to gravity. For practical purposes, when handling most materials, the vertical acceleration of an incremental area on the deck should lie within the range of from 1.5 to 3.0 times the acceleration due to gravity.

The following are specific examples of this invention:

EXAMPLE 1

A conveyor constructed as illustrated in Fig. 1, 10 ft. long and having a porous deck width of 12" with the struts 3 arranged at an angle of about 30° from vertical, vibrated at an amplitude of 3/16" at a frequency of 900 cycles per minute, conveyed ground fluorspar having a fineness of 100% at −50 mesh and 50% at −200 mesh and a density of about 85 lbs. per cu. ft., at a rate of more than 15 tons per hour. The conveying deck was substantially horizontal.

EXAMPLE 2

A conveyor like that used in Example 1 but having an 8" wide deck vibrated at ⅜" stroke and a frequency of 380 cycles per minute conveyed a 3" deep bed of Portland cement dust of −250 mesh at a rate of about 30 ft. per minute equal to about 15 tons per hour.

EXAMPLE 3

A conveyor like that used in Example 1 vibrated at a stroke of ⅜" and a frequency of 825 cycles per minute conveyed phosphate fertilizer dust of −250 mesh at a slightly greater rate than the cement dust was conveyed in Example 2.

In all of the foregoing examples, the porous deck was a canvas membrane having a pressure drop of about 1.5 lbs. per square inch when passing air at the rate of 10 cu. ft. per minute per square foot and an air flow of about 10 cu. ft. per minute per square foot was used.

The apparatus of this invention has been used successfully in conveying synthetic detergent under such atmospheric conditions that the material partially agglomerated, which would have made it impossible to convey the material on a conveyor relying entirely on aeration.

The thickness of bed to be maintained on the permeable deck for maximum efficiency depends on a variety of factors mostly related to the characteristics of the material to be conveyed and, of course, the angle of elevation or declination of the deck. Ordinarily, for most materials, a bed thickness of about 1 inch and preferably about 4" will give satisfactory results. That thickness can be regulated in a vibratory conveying apparatus by regulating the rate of feed thereto and in a feeder type of apparatus, the bed thickness may be, of course, regulated by the distance between the deck and the opening of the hopper.

In many cases, with all other conditions being the same, the speed at which the bed of material is conveyed increases, within limits, with an increase in the thickness of such bed. For example, by the use of apparatus constructed in accordance with this invention, when conveying a constant stream of soap powder with the permeable deck arranged at an angle of inclination of 7°, a bed depth of 1" was moved at a rate of 30 ft. per minute, whereas when the bed thickness was increased to 3", the rate of conveying of the bed increased to 120 ft. per minute.

The adjustment in bed thickness for maximum efficient operation can be made readily for each installation when handling a specific type of material by merely observing that thickness which will give maximum velocity of movement forwardly on the conveying deck. The adjustment of the bed thickness should be made simultaneously with an adjustment of the amount or volume of air caused to move upwardly through the permeable deck. These two factors are so related that it is impossible to give an empirical formula because of the added and dominating influence of the characteristics of the different materials.

When using the present invention, it is possible to convey, or more specifically to elevate, these fine materials which contain at least a substantial portion of fluidizable material which either (a) cannot be conveyed at all by either a vibratory or an aerating type of equipment, or (b) which, by the use of either of such types of equipment alone, cannot be thus conveyed except at a rate which is so slow as to be economically prohibitive.

In certain instances, for example when conveying fluorspar of −250 mesh, or phosphate fertilizer of −250 mesh, which could not be conveyed horizontally or in an upwardly inclined direction, by the use of an aerating type conveyor, and which could be conveyed in such directions with a vibratory conveyor only at insignificant rates, conveying speeds 25 to 30 times as fast, and thus economically feasible, were achieved by the use of the present invention.

A noteworthy feature of the present invention is that a bed of material in partly fluidized condition may actually be made to flow uphill, and yet the same material cannot be conveyed at all by a plain vibrating conveyor. Moreover, if, while this material in partly fluidized condition is being conveyed uphill by apparatus of the present invention, the vibrations are cut off, the material will immediately reverse and flow downhill in the opposite direction. On the other hand, should the air pressure be cut off while the vibrations are continued, the material flow will practically cease, if not stop altogether, this plainly illustrating that the present combination performs in a manner which neither the aerating type conveyor nor the vibrating type conveyor can do separately.

Other modes of applying the principle of the invention may be employed, change being made as regards the details described, provided the features stated in any of the following claims, or the equivalent of such, be employed.

I therefore particularly point out and distinctly claim as my invention:

1. The method of conveying a bed of pulverulent material forwardly along a gas-pervious deck arranged at an angle to the horizontal between about −5° and about +15°, which comprises the steps of: vibrating the deck in a controlled path of motion that has an angle of attack between about +10° and about +45° with respect to the plane of the deck, and passing aeriform fluid upwardly through the deck at a rate at least sufficient to permit the material to separate from the deck during each cycle of movement thereof, whereby the material is moved forwardly along the deck at a rate substantially greater than achieved when either such vibration of the deck or such passage of aeriform fluid through the deck is discontinued.

2. The method of claim 1 wherein the aeriform fluid is passed through the deck at a rate less than that required to fluidize the material.

3. The method of claim 1 wherein the deck is vibrated in a controlled path of motion that has an angle of attack of about +30° with respect to the plane of the deck.

4. The method of claim 1 wherein the deck is arranged at an angle to the horizontal between about 0° and about +15°.

5. The method of claim 4 wherein the deck during each cycle of movement acquires a vertical acceleration greater than that of gravity.

6. Apparatus for conveying pulverulent material in a path at an angle to the horizontal between about −5° and about +15° comprising an elongated conduit of which the top wall is a gas-pervious deck having a permeability such that there will be substantially no sifting therethrough of the finer particles of the material to be conveyed therealong while providing for the passage therethrough of aeriform fluid, means for supporting the deck for vibration in a directionally-controlled path having an angle of attack between about +10° and about +45° with respect to the plane of the deck, means for vibrating the deck along such controlled path, and means for supplying aeriform fluid into said conduit for upward flow through said deck at a rate at least sufficient to permit the material to separate from the deck during each cycle of movement thereof, whereby the material is conveyed forwardly along the deck at a rate substantially greater than achieved when either such vibration of the deck or such passage of aeriform fluid through the deck is discontinued.

7. The apparatus of claim 6 wherein the deck has a permeability such that the aeriform fluid will flow therethrough at a rate substantially not in excess of 10 cubic feet per minute per square foot of exposed deck area under the influence of a pressure equivalent to two inches of water.

8. The apparatus of claim 6 wherein the deck is supported for vibration in a directionally-controlled path having an angle of attack of about +30° with respect to the plane of the deck.

9. The apparatus of claim 6 wherein the vibrating means is adapted to move the deck at an amplitude and frequency such that the deck acquires a vertical acceleration greater than that of gravity.

10. The apparatus of claim 6 wherein the last-named means supplies the aeriform fluid into the conduit for upward flow through the deck at a rate less than that required to fluidize the material.

References Cited in the file of this patent

UNITED STATES PATENTS

| | | |
|---|---|---|
| 2,527,455 | Schemm | Oct. 24, 1950 |

FOREIGN PATENTS

| | | |
|---|---|---|
| 729,178 | Germany | Nov. 12, 1942 |
| 895,723 | Germany | Nov. 5, 1953 |
| 712,593 | Great Britain | July 28, 1954 |